US009141713B1

(12) United States Patent
Narin

(10) Patent No.: US 9,141,713 B1
(45) Date of Patent: Sep. 22, 2015

(54) SYSTEM AND METHOD FOR ASSOCIATING KEYWORDS WITH A WEB PAGE

(75) Inventor: Attila Narin, Bothell, WA (US)

(73) Assignee: Amazon Technologies, Inc., Seattle, WA (US)

(*) Notice: Subject to any disclaimer, the term of this patent is extended or adjusted under 35 U.S.C. 154(b) by 1119 days.

(21) Appl. No.: 11/323,858

(22) Filed: Dec. 30, 2005

(51) Int. Cl.
*G06F 17/30* (2006.01)

(52) U.S. Cl.
CPC .... *G06F 17/30876* (2013.01); *G06F 17/30828* (2013.01)

(58) Field of Classification Search
CPC .................. G06F 17/30876; G06F 17/30899; G06F 17/30828
USPC .................................................. 707/736, 749
See application file for complete search history.

(56) References Cited

U.S. PATENT DOCUMENTS

| 6,185,558 | B1 | 2/2001 | Bowman | |
| 6,314,410 | B1* | 11/2001 | Tackett et al. | 706/11 |
| 7,412,442 | B1 | 8/2008 | Vadon | |
| 2002/0019763 | A1* | 2/2002 | Linden et al. | 705/10 |
| 2002/0111907 | A1* | 8/2002 | Ling | 705/41 |
| 2003/0120560 | A1* | 6/2003 | Almeida | 705/27 |
| 2004/0059720 | A1* | 3/2004 | Rodriguez | 707/3 |
| 2005/0086510 | A1* | 4/2005 | Nicodemus et al. | 713/200 |
| 2005/0267872 | A1* | 12/2005 | Galai et al. | 707/3 |
| 2007/0226202 | A1* | 9/2007 | Cava | 707/4 |

OTHER PUBLICATIONS

"2002 Google Programming Contest Winner," © 2002 <http://www.google.com/programming-contest/winner.html> [retrieved Apr. 25, 2007], 2 pages.
Galperin, V., "Method and System for Associating an Advertisement with a Web Page," U.S. Appl. No. 11/255,096, filed Oct. 19, 2005.
Jazayeri, R., "Google as a Bookmarking Tool," master's thesis, Massachusetts Institute of Technology, Cambridge, Mass., 2004, 67 pages.
Vadon, E.R., "Identifying Items Relevant to a Keyword," U.S. Appl. No. 10/966,827, filed Oct. 15, 2004.

* cited by examiner

*Primary Examiner* — Hosain Alam
*Assistant Examiner* — Johnese Johnson
(74) *Attorney, Agent, or Firm* — Knobbe Martens Olson & Bear LLP

(57) ABSTRACT

A web page optimization engine for optimizing a web page is described. The web page optimization engine includes a keyword mapping engine configured to generate a keyword map including a listing of keywords, where each keyword is associated with one or more web pages. The web page optimization engine further includes a map reversal engine configured to generate a web page map including a listing of web page subject matters, where each web page subject matter is associated with one or more keywords based on the associations from the keyword map. The web page optimization engine yet further includes a web page generation engine configured to generate a web page for a web page subject matter in the web page map to include at least one of the one or more keywords for that web page subject matter.

39 Claims, 7 Drawing Sheets

| Keywords | Products | | | |
|---|---|---|---|---|
| Keyword 1 | Product 1 | Product 2 | Product 3 | |
| Keyword 2 | Product 2 | Product 4 | Product 5 | |
| Keyword 3 | Product 1 | Product 2 | Product 6 | |
| Keyword 4 | Product 1 | | | |

FIG. 3A

| Products | Keywords | | | |
|---|---|---|---|---|
| Product 1 | Keyword 1 | Keyword 3 | Keyword 4 | |
| Product 2 | Keyword 1 | Keyword 2 | Keyword 3 | |
| Product 3 | Keyword 1 | | | |
| Product 4 | Keyword 2 | | | |
| Product 5 | Keyword 2 | | | |
| Product 6 | Keyword 3 | | | |

FIG. 3B

SYSTEM AND METHOD FOR ASSOCIATING KEYWORDS WITH A WEB PAGE

BACKGROUND OF THE INVENTION

Consumers increasingly utilize the Internet to make purchases of goods and services. Consumers make these purchases utilizing a purchasing interface implemented as a web site including a web page or a series of web pages. A web site may be configured to offer products, including both goods and/or services, for sale. The web site may include a search engine to allow the consumer to search through the products offered for sale. The web site may be created and maintained by the provider of the goods and/or services or by another entity. The web site may be configured to provide users with information to assist the user in deciding to make a purchase. The web site may further include functionality configured to allow the user to easily purchase one or more goods or services.

A user desiring to make a purchase over the Internet often begins the purchasing process by entering one or more keywords in a search engine. The search engine uses the keywords to generate a listing of search results, where each search result may be associated with a provider of goods or services associated with the keywords. The search results listing is often quite large and may include multiple pages of search results where each page includes some portion of the search results. For example, a first web page may be used to display the first ten search results, a second web page may be used to display the second ten search results, etc. Because of the large number of search results, and the correspondingly large number of pages displaying those search results, a user may have difficulty finding websites of interest to the user, particularly if the relevant website is displayed on a fourth, fifth, or even later page of search results.

In order to assist users, search engines often use an automated ranking algorithm to rank the search results based on relevancy. The relevance of each search result is generally determined based on a number of factors, including the content or subject matter of the web page, the number of other web pages having links to that web page, etc. Web page subject matter may include a product featured on the web page and related information, the subject of a news story displayed on the web page, a category associated with items displayed on the web page, etc. However, determining the relevancy of a particular web page to a keyword search is an inherently difficult task. If a web page does not happen to use the same terms that a user might include in a search for that web page, then identifying the web page as relevant to the search is often quite difficult.

What is needed is a system and method for identifying keywords relevant to a web page. What is further needed is a system and method for modifying a web page for the sale of products to include the keywords associated with the product. It will be appreciated that while the teachings herein describe certain features and advantages that may be achieved, the teachings herein may be used to implement systems and methods that do not necessarily achieve any of these features or advantages, but rather achieve other features and advantages.

SUMMARY

One embodiment relates to a web page optimization engine for optimizing a web page. The web page optimization engine includes a keyword mapping engine configured to generate a keyword map including a listing of keywords, where each keyword is associated with one or more web pages. The web page optimization engine further includes a map reversal engine configured to generate a web page map including a listing of web page subject matters, where each web page subject matter is associated with one or more keywords based on the associations from the keyword map. The web page optimization engine yet further includes a web page generation engine configured to generate a web page for a web page subject matter in the web page map to include at least one of the one or more keywords for that web page subject matter.

Another embodiment relates to a method for optimizing a web page for a product. The method includes aggregating data from at least two users to generate a keyword map including a listing of keywords, where each keyword is associated with one or more products, and generating a product map including a listing of products, where each product is associated with one or more keywords based on the associations from the keyword map. The method further includes generating at least one web page for a product in the product map to include at least one of the one or more keywords for that product.

Another embodiment relates to a web page optimization system for optimizing a product web page for a product. The system includes a search engine configured to receive one or more keywords, generate a search results listing based on the one or more keywords, the search results including one or more-products, and generate an association indicator based on the one or more keyword and activity of a user responsive to the search results listing. The system further includes a web page optimization engine having a keyword mapping engine configured to generate a keyword map including a listing of keywords based on the association, where each keyword is associated with one or more products. The engine further includes a map reversal engine configured to generate a product map including a listing of products, where each product is associated with one or more keywords based on the associations from the keyword map and a web page generation engine configured to generate at least one web page for a product in the product map to include at least one of the one or more keywords for that product.

BRIEF DESCRIPTION OF THE DRAWINGS

FIG. 3A is a keyword to product map including a listing of keywords and the products that were associated with those items by a search engine, according to an exemplary embodiment;

FIG. 3B is a product to keyword map including a listing of products and the keywords that have been associated with each product, according to an exemplary embodiment;

DETAILED DESCRIPTION OF THE PREFERRED EMBODIMENTS

Figure 1:
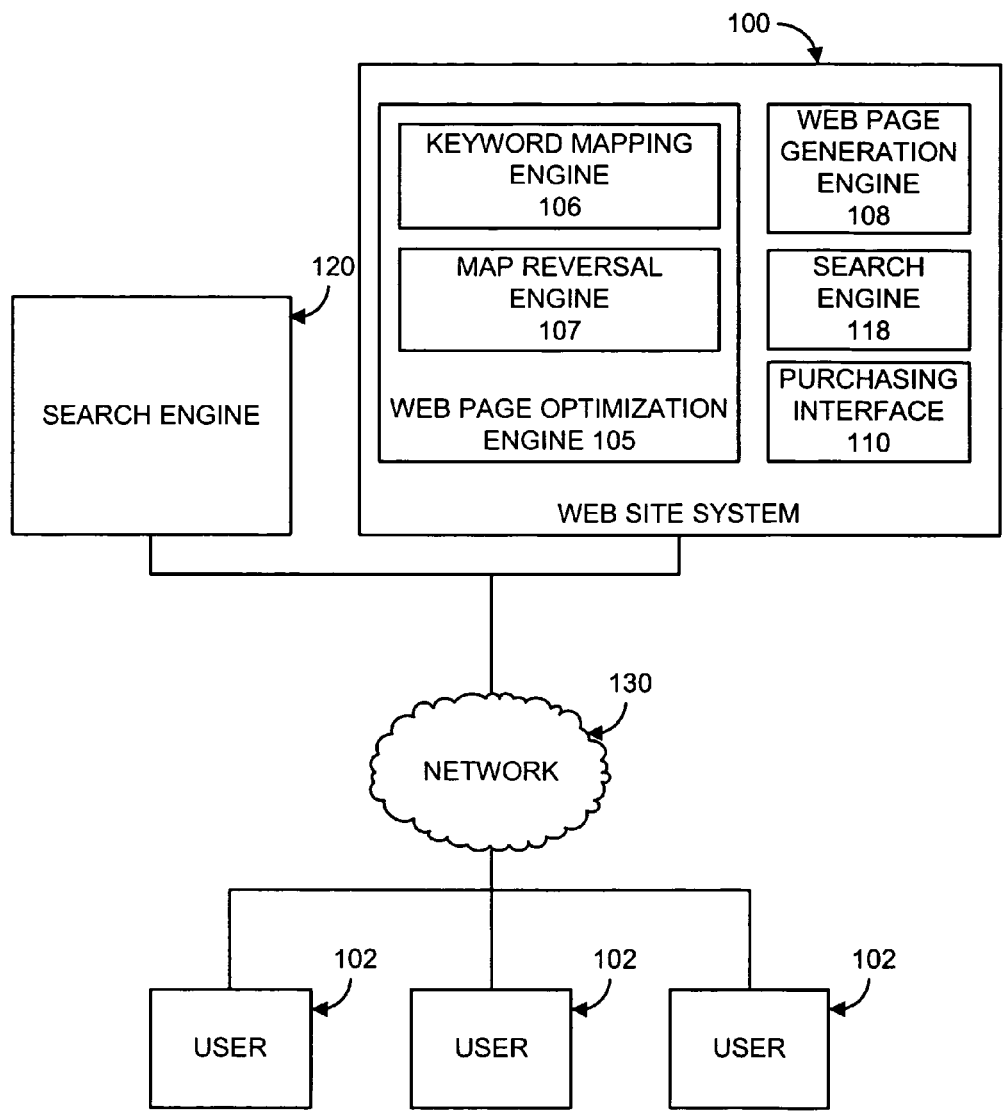
FIG. 1 is a block diagram illustrating a web page optimization system for optimizing web pages, according to an exemplary embodiment.

Referring to FIG. 1, a web site system 100 including a web page optimization engine 105 for optimizing web pages 110 is shown, according to an exemplary embodiment. The web page optimization engine 105 optimizes the web pages 110 by making it easier for an automated ranking algorithm of a search engine 120 to determine whether the web pages 110 are relevant to a particular keyword search. The web pages 110, which may be generated by a web page generation engine 108, are optimized by including keywords shown to be associated with purchases or selections of products being offered for sale through web pages 110. The above described web site system 100 and search engine 120 are configured to interact with each other and one or more users 102 through a communication network 130, such as the Internet.

Web site system 100 and search engine 120 may be implemented as computing systems or computer programs to be executed using a computer system. The web site system 100 and search engine 120 may be implemented using a single computing system (e.g., comprising one or more servers) or separate computer systems configured to communicate through a communication channel, such as a direct connection or a communication network 130. Methods and systems described herein as being associated with a particular engine or interface may alternatively be associated with a different engine or interface to achieve the functions described herein.

Web page optimization engine 105, hereinafter referred to as optimization engine 105, includes a keyword mapping engine 106 and a map reversal engine 107. Keyword mapping engine 106 is configured to generate and maintain a listing of keywords where each keyword has been associated with one or more products. Map reversal engine 107 is configured to generate a listing of products, where each product is associated with keywords, based on the listing of products maintained by keyword mapping engine 106.

Web page generation engine 108 is configured to generate one or more web pages or other purchasing interfaces for one or more products which include the keywords associated with that product by map reversal engine 107. Generating a web page may include modifying an existing web page to include the keywords. Although specific engines are described as performing specific functions, it should be understood that any function may be implemented by any alternative engine to perform the functions described herein.

Web pages 110 may relate to one or more products and may be configured to provide information about the products including photographs, detailed product descriptions, testimonials, etc. Web pages 110 may further include functionality allowing users 102 to purchase the product associated with a particular web page 110, either directly or by linking to other web pages. Web pages 110 are described in further detail below with reference to FIG. 4. Alternatively, web pages 110 may be content web pages unrelated to on-line retail or purchasing, such as on the web site of a news source, interest group, and so on.

Search engine 120 may be any type of search engine configured to receive one or more search terms, hereinafter referred to as keywords, and generate a listing of search results. Search engine 120 may be configured to retrieve data, files, or documents from a database or network, such as the Internet, based on the keywords entered by a user 102 or other user of a search engine website. The listing of search results may be a listing of web pages or web sites offering information or functionality associated with the keywords that were entered by the user. The listing of search results may be displayed on multiple pages. For example, a first web page may display the first 20 results, a second page may display the second 20 results, etc.

The web site system 100 may include its own product search engine 118 which may be used to search for products within the web site implemented by the web site system 100. Search engine 118 may be any type of search engine configured to performing searching functions as described above with reference to search engine 120. Search engine 118 may be configured to display items associated with the keywords and also offered for sale through the web pages 110. For example, web pages 110 may implement a purchasing interface for a bicycle seller. The search engine 118 may be configured to allow a user to search through all of the bicycles that are available for sale through the bicycle seller and display the search results using web pages 110. For example, each search result may be associated with a web page 110 for a specific bicycle.

Figure 2:
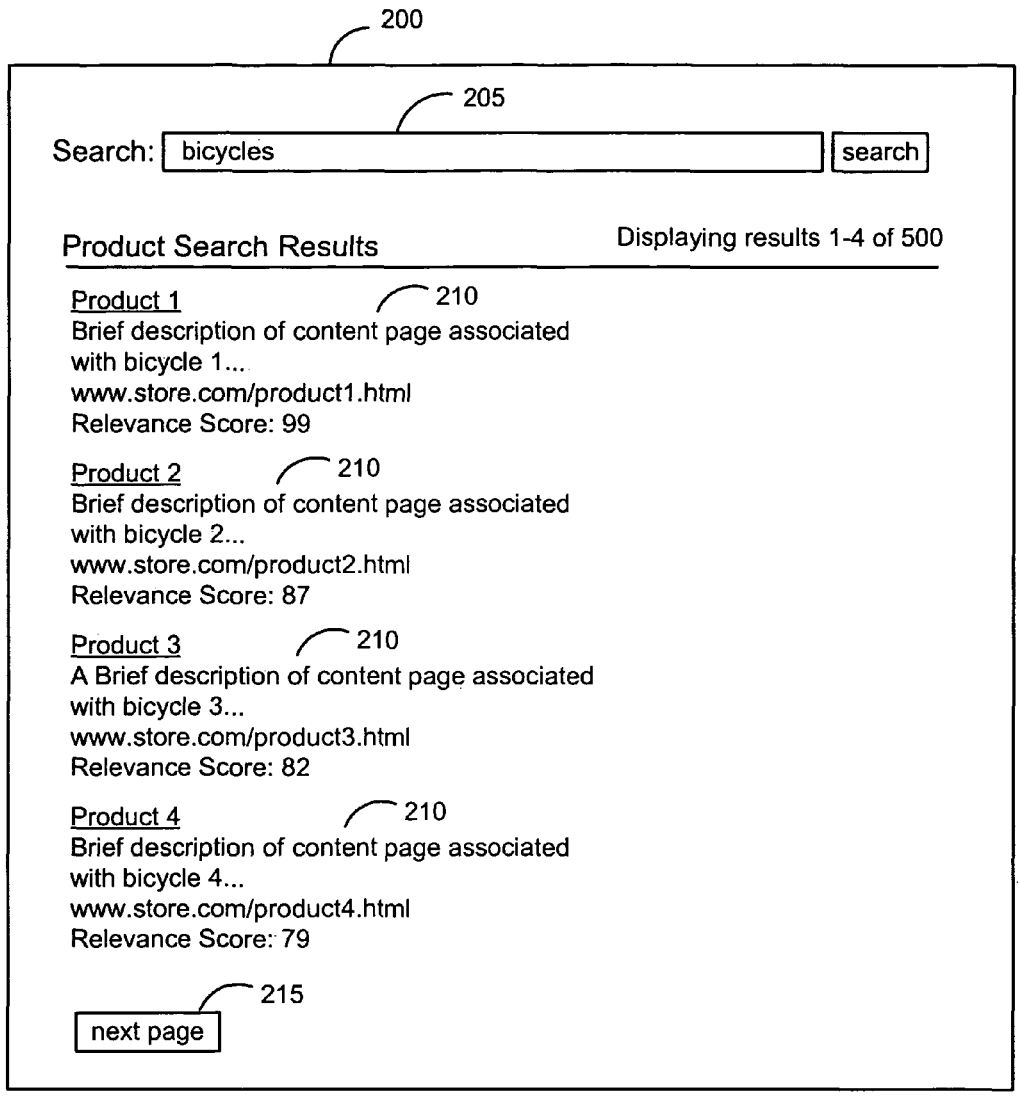
FIG. 2 is a screen shot that illustrates a search results web page, according to an exemplary embodiment.

Referring now to FIGS. 2, 3A, and 3B, the manner in which web page optimization engine 105 identifies keywords to be associated with a web page is described in greater detail. Referring first to FIG. 2, when search engine 118 is provided with one or more search terms from a user, the results of the search may be provided by search engine 118 in the form of data, such as data for a search results web page, which may include a listing of content-based web pages associated with the search term. FIG. 2 illustrates a search results web page 200 displayed using search results data from search engine 118, according to an exemplary embodiment. While the search results data provided by search engine 118 is generally described with reference to FIG. 2 in the context of a displayable search results web page, it will be understood that the search results data may be provided in other forms, such as, for example, a direct data input to web page optimization engine 105 or another component of system 100.

In the illustrated example, search engine 118 has executed a search for the search term "bicycles" in field 205 and has provided a-set of listing of search results consisting of hyperlinks 210 to content-based web pages regarding, for example, products associated with the search term "bicycles." In this embodiment, hyperlinks 210 may represent web pages 110 providing detailed information about various individual products for sale. A subset of the resulting hyperlinks 210 are displayed along with a button 215 to allow the next set of search results to be accessed.

Web page 200 may be configured to allow a user 102 to select one or more of the hyperlinks in the search results listing to display a web page 110 associated with the particular search result that was selected. Search engine 118 may further be configured to communicate the keywords that were used to generate the search results and an indication of the search result that was selected based on the entry of the keyword by user 102. The keyword association with a particular product may be communicated to web page optimization engine 105.

Although FIG. 2 is discussed in the context of search engine 118, it will be appreciated that search engine 120 may also be configured to communicate keywords that were used to generate search results and an indication of the search result that was selected based on the entry of the keyword by user 102. For example, if a user performs a search for a product from search engine 120, and lands directly on a web page 110 associated with that product, the keywords that caused the user to land on that page may be communicated by the search engine 120 to the web page optimization engine 105. This information may be used alone or in combination with the information from search engine 118.

Referring now to FIG. 3A, a keyword to product map 300, hereinafter map 300, including a listing of keywords and the products that were associated with those keywords by search engine 118 is shown, according to an exemplary embodiment. Keyword to product map 300 may be generated by aggregating keyword associations with products from multiple searches performed by multiple users 102. The keyword association data may be received either from the search engine 118 or from independent search engine 120. The keyword to product map may be constructed by monitoring and recording the activity of a user on the website and making assumptions and/or calculations based on the activity, for example, in accordance with the teachings of U.S. Pat. No. 6,185,558, entitled "Identifying the items most relevant to a current query based on items selected in connection with similar queries" hereby incorporated by reference.

In an exemplary embodiment, in constructing the map 300, keyword mapping engine 106 is configured to take into account not only immediate browsing activity of the user (e.g., which search result from a list of search results was selected by the user after a keyword search), but also subsequent browsing activity. For example, the keyword map may be constructed based on information such as whether the user completed a purchase after the selection, what other pages the user visit after the search results were returned, whether the user returned to the page and made an alternative selection (indicating that the user did not find what they were looking for on the first web page), etc. For example, a user 102 may enter a keyword related to the name of a popular movie and ultimately may purchase a product apparently unrelated such as a CD by a particular artist. The relationship between the movie and the particular artist may not be intuitive and therefore may not be recognized by an automated ranking algorithm. There may be no readily apparent connection between the items other than the user behavioral pattern detected by web pattern optimization engine 105. However, based on aggregate purchasing data, web page optimization engine 105 may determine that there exists some connection between the two (e.g., the artist has a song on the movie soundtrack), particularly if the same pattern of behavior is observed for multiple users.

Accordingly, by taking into account past user activity, map 300 can capture and utilize user associations to facilitate user searching. For example, map 300 can be used to provide the user with not only the information that the user was seeking, but also information that the user was not seeking that would probably be of interest to them. For example, using the CD example above, a user may not even be aware of the CD by the particular artist. However, since a number of other users typing the same search did express interest in the CD, there is a strong possibility that the current user may also be interested. This possibility may be reflected in the aggregate purchasing data in map 300, and may be made accessible to the user by displaying selectable search queries on the web page, as described below.

Map 300 may further be augmented by assigning a ranking to each product associated with a keyword. The ranking may be relative to other products that are also associated with the keyword. The ranking may be implemented as a relevance score. For example, products that have been repeatedly selected by users may be given a higher relevance score while products that have only been provided sporadically in association with the keyword may be given a lower relevance score. Map 300 may also be augmented using different methods such as weighting, data aging, etc. Keyword mapping engine 105 may be configured to modify map 300 based on input from sources other than search engine 118 or 120 or from more detailed information generated by search engine 118 or 120.

Products may also be associated with keywords based on information associated with each product. For example, search engine 120 may be configured to associate a product category with that a keyword based on a known relationship between the product and the category. The product may be within the category, an accessory of items in the category, a product that is often purchased at the same time as items in the category, be made by a manufacturer of items normally associated with the category, etc. Accordingly, each keyword may be associated with both products as well as categories of products.

Products may also be associated with keywords based on other types of relationships. For example, map 300 may map keywords to product categories, keywords to browse nodes, and so on. Additionally, user 102 may enter a keyword based on an actual or perceived relationship between the keyword and the good or service sought by the user. For example, a user seeking to purchase an MP3 player may enter the name of a well-known MP3 player as a search term based on the actual relationship of that name with an MP3 player. Alternatively, a user may enter a common misspelling of the manufacturer's name or may enter some other term associated with the product, based on a perceived relationship. The keyword data may further be associated with both broad and narrower categories of products. For example, if the product is a particular model of brand name camera, the listing of keywords may be associated with that particular model of brand name camera, as well as the broad category of products including all cameras having the same brand name. The strength of the actual or perceived relationship may be based on the number of times the relationship is reinforced by users 102 through repeated selection of the product based on the keyword.

Although a single map is described above with reference to map 300, system 100 may be configured to generate more than one keyword to product map. For example, a first map may be created for a first group of users and a second map may be created for a second group of users. The groups of users may be defined according to an attribute associated with the users such as geographical location, age, gender, interests, etc.

Referring now to FIG. 3B, a product to keyword map 310 is shown including a listing of products and the keywords that have been associated with each product, according to an exemplary embodiment. Optimization engine 105 may be configured to reverse map 300 to generate product to keyword map 310, hereinafter reverse map 310. Reverse map 310 may further include the additional information such as the categories and relationship that were associated with each keyword, the relevance score indicating the strength of the relationship between the keyword and the product, and so on. Accordingly, product to keyword map 310 may be indexed by product where each product is associated with one or more keywords. Where multiple maps 300 are provided, generating the reverse map 310 may include generating multiple reverse maps, one for each map 300.

Advantageously, reversing the keyword to product map 300 to generate product to keyword map 310 produces a listing of the keywords that are most relevant for the product. Each product will be associated with keywords that have been shown to be relevant to the particular product based on actual user activity. These keywords may include keywords for accessories, related products, products that are commonly associated with the product, keywords for products that are often purchased together with the product, etc. Keyword map 310 may be maintained for thousands or millions of product pages or more (as needed, depending on the number of products offered on the website of website system 100), allowing keywords to be generated for any product page in the keyword map 310, and avoiding the need to generate optimum keywords for each web page manually.

Further, as indicated above, for each product, keywords may be ranked based on their relevance to the particular product. The ranking may be implemented as a relevance score. The relevance score may be proportional to the number of users that have searched for the keyword and then taken a subsequent action, such a clicking a web page, making a purchase, etc., for the particular product. For example, keywords that have been associated with users that have made purchases of the product may be given a higher relevance score while keywords that have only been provided sporadically in association with the product may be given a lower relevance score. The relevance score of each keyword may further be incorporated from map 300 such that the higher the relevance of a product to a particular keyword within map 300, the higher the relevance of the keyword for the product within reverse map 310.

Map 300 and reverse map 310 may be configured to be created and continually updated based on received keywords, products, and associations. Updating may include addition of new keywords and/or products, deletions of older or "stale" keywords or products, updating of relevance scores, etc. For example, older data may get weighed less heavily than newer data in determining the relevance score. Updates and/or changes to map 300 may trigger an update to reverse map 310 and/or web pages displaying information based on reverse map 310, described with further detail below with reference to FIG. 4.

Although map 300 and 310 are described above with reference to creating associations between keywords and products, system 105 may also be configured to create associations between keywords and other web page subject matter. Web page subject matter is the general subject matter represented in the web page. In the context of an on-line retail web site, for example, the subject matter of a web page (e.g., a product detail page) may be the particular product described on the page, as described above. In other types of web sites, the web page subject matter may relate to other subject matter. For example, the subject matter "bicycling" may be represented in both an informational web page created by a bicycling enthusiast and a web page containing a news article about the Tour de France. Thus, for an on-line newspaper, the web page subject matter may be the subject matter of a particular news story or the news story itself.

Figure 4:
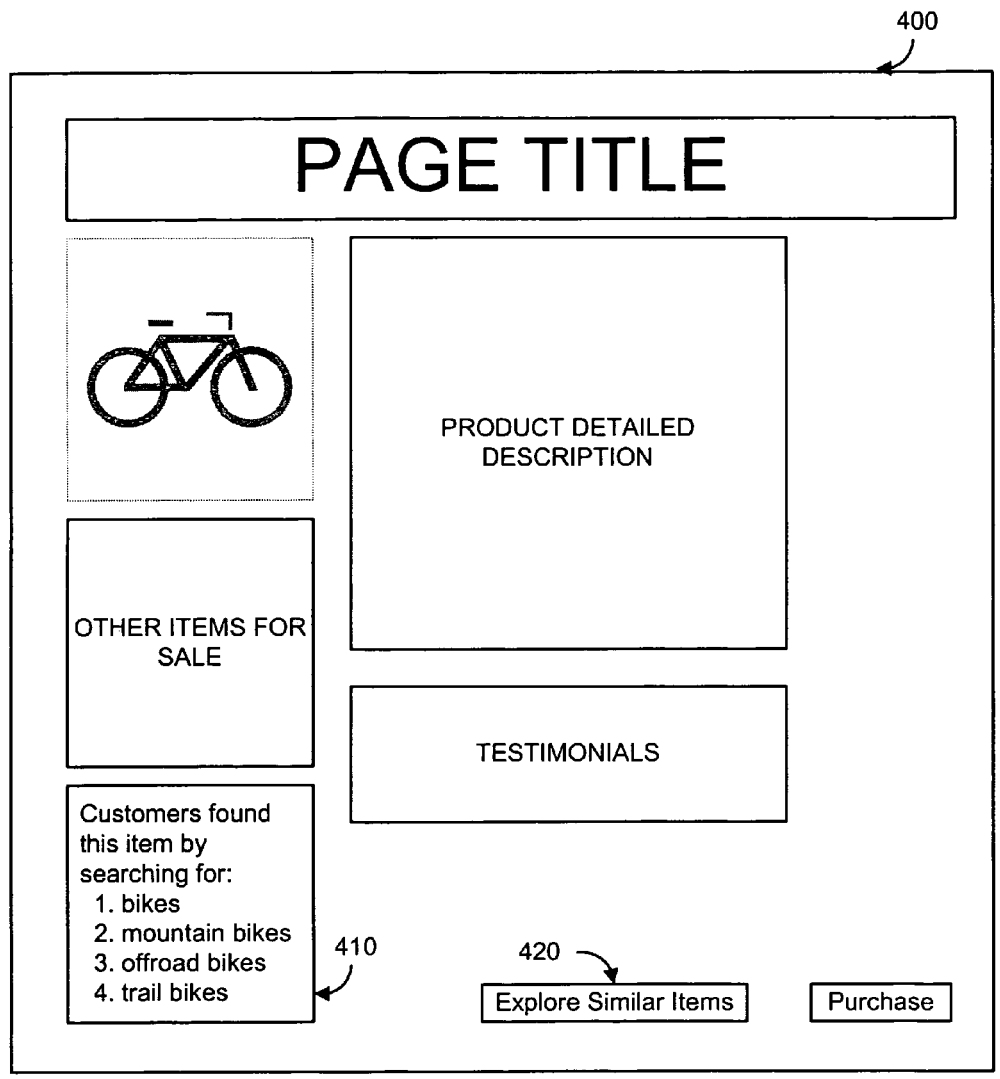
FIG. 4 is a web page implementing a purchasing interface for a product that is associated with a listing of keywords in the map of FIG. 3B, where the web page is configured to include the listing of keywords associated with the product in the map, according to an exemplary embodiment.

Referring now to FIG. 4, a web page 400 for a product that is associated with keywords in reverse map 310 is shown, according to an exemplary embodiment. In FIG. 4, web page 400 includes the keywords associated with the product in reverse map 310. Web page 400 may be created and maintained by a web page publisher and be configured to display information and functionality associated with the product to a visitor to the web page. The information may include a photograph showing the product, testimonials, purchasing functionality, or any other information or functionality that may be of interest to a potential customer desiring to purchase or considering a purchase of the product.

Web page 400 may be configured to include one or more Meta Tags. Meta Tags are data stored on the web page but not necessarily displayed to a user 102. The two most popular Meta tags used for search engine optimization are a Meta description tag and a Meta keyword tag. The Meta description tag allows web site publishers to describe the subject matter of the web page. Search engines 120 may use Meta description tag information to display the description of a web site in the search results. The Meta keyword tag allows web site publishers to put keywords in web page 400 to help search engines 120 determine the subject matter of web page 400.

Optimization engine 105 may be configured to incorporate one or more of the keywords associated with the product in reverse map 310 into one or more of the Meta Tags. Because these keywords have been provided by users 102 that have shown a particular interest, it is more likely that users in the future entering these keywords will be interested in web page 400 and will benefit from the placement of the keywords in web page 400. The relevance of web page 400 to the keywords has been shown by historic user activity as represented in reverse map 310. Insertion of the keywords in web page 400 may help an automated ranking algorithm of search engine 120 identify web page 400 as relevant to a search including that keyword, such that web page 400 will be displayed higher in the listing of search results.

In addition to use in the Meta Tags, the keywords may further be used to generate a listing of keywords 410 that is displayed to a user 102 viewing web page 400. Listing of keywords 410 may be listed with an appropriate title such as "Customers found this item by searching for:" followed by the keywords. The keywords may also be used within the URL description, the page title, keywords in backlinks, etc. The user may further be provided with the ability to select keywords from the listing 410 to perform a search to find related products. Web page 400 may alternatively include other listings of keywords that are provided for different purposes, such as helping a user discover related or different products. For example, web page 400 may include a listing of keywords related to other searches performed by users that viewed the current web page, other web pages viewed by users that viewed the current web page, other items purchased by users that entered the same search terms as the user, etc. Thus, the listing of keywords may be displayed to the user in order to provide the user with an additional tool to discover related products.

Figure 5:
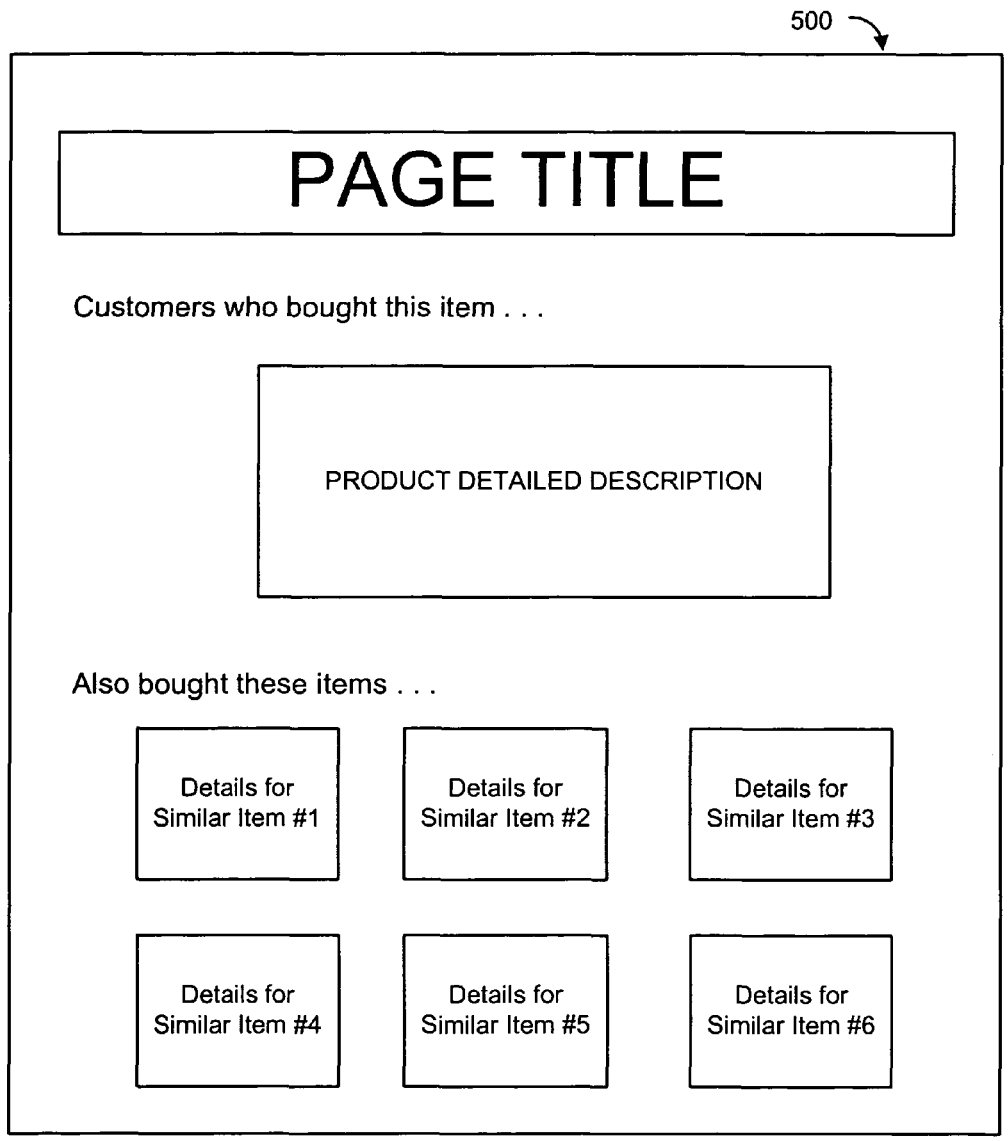
FIG. 5 is a web page for a primary product and further for additional items that are similar to the primary product, according to an exemplary embodiment.

Referring now to FIG. 5, web page 500 shows a web page that contains secondary products that are similar to a primary product. For example, the web page 500 may be a page that would be reached if a user clicks on the explore similar items button 420 in FIG. 4. In FIG. 5, each of the different products (including the primary product and the secondary similar products) may have an associated set of keywords in reverse map 310. For web page 500, the keywords that are added to the Meta Tag and/or that are displayed to the user may be a composite of the keywords for the primary product and the keywords for the secondary products. In such an arrangement, in selecting keywords for web page 500, keywords that are specific to individual products may be weighed less heavily than keywords that are general to both the primary products and the secondary products. In this manner, a general set of keywords for web page 500 may be developed. As a result, when a user conducts a search at search engine 120 using general keywords related to a particular product, the user may be more likely to land at web page 500 due to the higher correspondence between the general keywords entered by the user and the general keywords for the web page 500. Accordingly, where a user enters general search terms, web page 500 is more likely to show up higher in the search rankings than a more detailed product page such as web page 400 in FIG. 4, and therefore is more likely be the landing page for the user.

Figure 6:
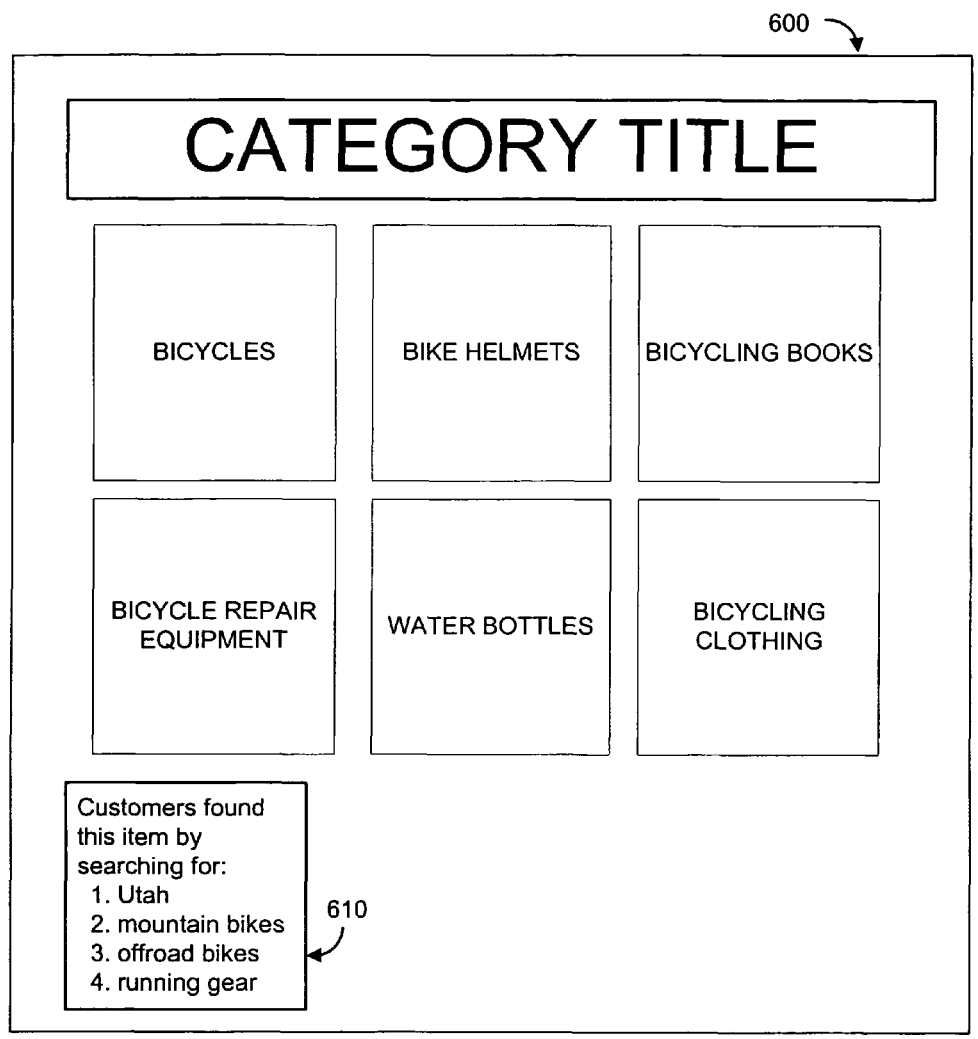
FIG. 6 is a web page for a broad category of products that is associated with keywords in the reverse map of FIG. 3B, according to an exemplary embodiment.

Referring now to FIG. 6, a web page 600 for a broad category of products that is associated with keywords in reverse map 310 is shown, according to an exemplary embodiment. Web page 600 is a product category page that may be displayed based on entry of the keyword bicycles in search engine 118 or search engine 120. As indicated above, map 300 and reverse map 310 may map keywords to product categories (and vice versa), keywords to browse nodes (and vice versa), and so on. Generally, web page 600 may include either a listing of products within a product category (such as brands of bicycles) or product categories that having a common theme (such as bicycling products). The entries with the listing are selectable by a user 102. Selection of a product will display a web page related to that particular product, similar to web page 400. Selection of a product category will display a listing of multiple products within that product category.

In FIG. 6, web page 600 includes the keywords associated with the product category in reverse map 310. For example, web page 600 may be configured to include one or more Meta Tags similar to web page 400 described above with reference to FIG. 4.

In addition to use in the Meta Tags, the keywords may further be used to generate a listing of keywords 610 that is displayed to a user 102 viewing web page 600. The listing of keywords may be useful with reference to broad categories to identify of items of interest in other broad categories. For example, users who have entered keywords associated with bicycles may also frequently be interested in books about Utah because Utah has good quality biking trails. Displaying listing 610 may help newer bicyclists to recognize that books about Utah may be of interest.

Figure 7:
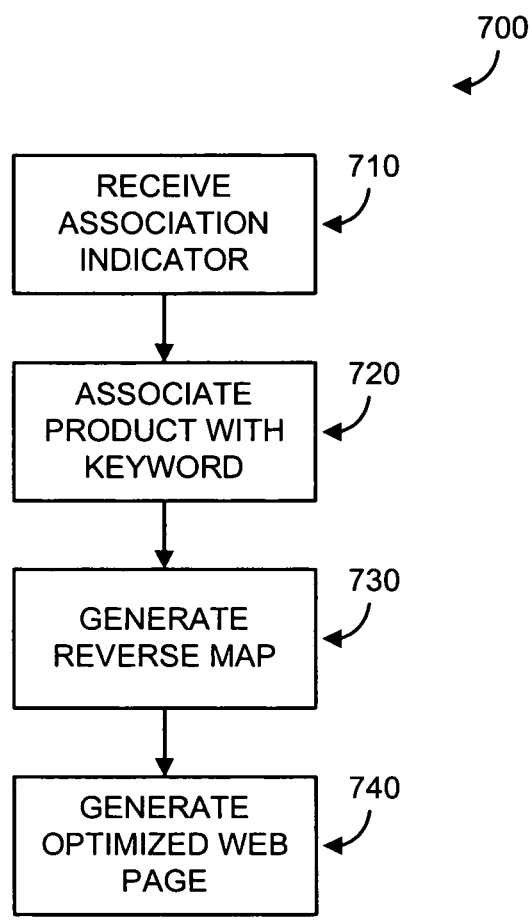
FIG. 7 is flowchart illustrating a method for determining keywords associated with a product by reversing associations between keyword and products and inserting the keyword in a web page for the product, according to an exemplary embodiment.

Referring now to FIG. 7, a flowchart illustrating a method 700 for determining keywords associated with a product by reversing associations between keyword and products and inserting the keyword in a web page for the product is shown, according to an exemplary embodiment. Method 700 may be implemented by optimization engine 105 in conjunction with search engine 120 and web site system 100.

In a step 710, an association indicator is received by optimization engine 105. An association indicator is any type of indication that a product is associated with a particular keyword. For example, the indicator may be an indication that a user 102 has clicked on a search listing for the product after the keyword was used to generate the search listing, an indication that a user has purchased the product after using the keyword, etc.

The association indicator may be received either directly based on an association indicator received by optimization engine 105, or indirectly, where the association indicator is detected by another system, such as search engine 120, and communicated to optimization engine 105. Further, the association may take into account aggregate user activity for multiple users and for all activity of a given user after a given search has been performed. As described above, a direct association may exist where a user 102 enters a keyword and then selects the product associated with that keyword. An indirect association may exist between the product and the keywords where the user engages in other browsing activity on the website before ultimately selecting a product.

In a step 720, the product is associated with the keyword within map 300. Association with the keyword may include association with the actual keyword, association with other keywords having some relationship to the keyword, association with a category associated with the keyword, etc.

In a step 730, map 300 is reversed to create reverse map 310 including a listing of products, and the keywords that are associated with each product. Map 310 may be generated using a standard database program configured to perform the transmutation described above with reference to FIG. 3B.

In a step 740, the keywords associated each product in map 310 may be inserted into a web page 400 associated with each particular product. Insertion may include population of one or more Meta Tags with the keywords. Insertion may further include reconfiguration of a listing of keywords 410 appearing on web page 400. Insertion may yet further include underlining, bolding, making selectable, or otherwise highlighting instances of the words that appear to the user on web page 400 (e.g., bolding words already appearing in the text of a news article). The words may be made selectable, for example by a hyperlink associated with the keyword that will link the user to a web page directed to the keyword or that will initiate a new search based on the keyword.

Method 700 may be utilized to generate a web page associated with the a product offered for sale by the operator of the search engine. Alternatively, method 700 may be performed on behalf of a third party where the third party provides user tracking information to the web site system 100 performing method 700. Web site system 100 may store and process the user tracking information to generate either a web page or a listing of keywords for the third party. Web site system 100 may further provide program code to be used by the third party in generating the user tracking information, inserting the keywords, generating a web page, etc.

According to an exemplary embodiment, step 740 may be performed by optimization engine 105 automatically without human intervention, allowing optimum keywords to be included on the web page without manual selection of the keywords and reconfiguration of the web page. For example, a plurality of web pages 400 may be stored in a database associated with or accessible by optimization engine 105. If web page 400 is dynamically generated, each web page may comprise a template comprising fields that are populated with data based on service requests made to services at the time the page is generated. For the web pages 400-600, as part of the process of generating the web page, the web page generation engine 108 may make a service request to the optimization engine 105, which may respond to the service request by supplying a list of keywords for publication with the web page. The web page generation engine 108 may then populate the web page with the keywords in one of the fields of the template (e.g., the field 410, the field for the meta tag, and/or other fields). If web page 400 is statically generated, optimization engine 105 may be configured to include a text modification engine configured to automatically insert the keywords and any necessary supporting information into the html or other code associated with each web page 400-600 based on reverse map 310.

Here and throughout, terms such as "user," "publisher," "visitor," and so forth are to be understood in the broadest possible sense. Herein, the term "user" is used generically to refer to consumers, advertisers, publishers; and visitors. By way of illustration and not of limitation, a "publisher" is not restricted to persons or entities who purport to be in the on-line publishing business (or any other kind of publishing business), nor to entities who have complete or even primary control dyer the content of particular websites; but rather is used in a more general sense. In the context of Internet-based advertising, for example, "publisher" includes any person or entity responsible directly or indirectly for putting content on the Internet, whether by hosting or sponsoring websites, posting pages, frames, graphics, applets, blogs, audiovisual content, etc., on their own or others' websites, providing web services that can source content for websites, or in any other manner. Still further, a "visitor" may be an individual who visits and views or otherwise perceives the content of a web site and pages therein via a web browser or other client software program running on a personal computer, wireless handheld device, or the like, but may also be, for example, a corporate or other entity whose servers access published web content and advertisements by invoking web services through appropriate application programming interfaces (APIs); a "visitor" may or may not be the intended or actual end user of a product or service that is the subject of an advertisement, etc. A visitor may also be an automated system, such as a web crawler associated with a search engine. A "potential customer" may be an individual who views advertising, regardless of the media in which it is published (e.g., print, television, on-line, etc), and may or may not be the intended or actual end user of a product or service that is the subject of an advertisement, etc. In sum, persons of skill in the art will appreciate that a wide variety of actors, more than can be conveniently set forth here, can play the roles of "advertiser," "publisher," and "visitor" for purposes of the present invention. It will be further appreciated that the selfsame person or entity may be both "publisher" and "advertiser," or both "publisher" and "visitor," or both "advertiser" and "visitor", or even all three, depending on the context. In a similar Vein, and as will be apparent from the foregoing, terms such as "web page," "website," and so forth are used to give specific illustrative examples of settings in which on-line content and advertisements can be presented to and perceived by users. Such examples are not intended to be limiting, and persons of skill in the art will appreciate that many other such settings now known or yet to be developed may be suitable to the practice of the present invention in specific embodiments.

It should be noted that although flow charts may be provided herein to show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule-based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs. It is to be understood that any method steps as recited herein (e.g., in the claims) may be performed by a configuration utility (e.g., Java™-based) executed by a computing device based on input by a user. Of course, according to various alternative embodiments, any suitable configuration utility, application, system, computing device, etc. may be used to execute, implement and/or perform method steps as recited in this disclosure (including the claims).

The invention is described above with reference to drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, PROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention are described in the general context of method steps which may be implemented in one embodiment by a program product including machine-executable instructions, such as program code, for example, in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet, and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules, and other data for the computer.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A non-transitory computer readable storage medium having computer executable instructions stored thereon that, when executed by a computer, cause the computer to:
   receive a plurality of search criteria corresponding to a plurality of user searches for products offered for sale over a computer network, wherein each search criterion of the plurality of search criteria corresponds to a search criterion utilized in a user search of the plurality of user searches;
   receive information related to browsing activity of users responsive to search results of the plurality of user searches;
   for each search criterion of the plurality of search criteria, generate a search criterion map mapping the search criterion to a set of products, wherein the set of products are determined based at least in part on the browsing activity of a user responsive to the search results corresponding to the search criterion, wherein each search criterion map is associated with a user group of a plurality of user groups and references one or more products associated with each search criterion, and wherein each user group is defined according to at least one attribute associated with each user included in the user group;
   for each product referenced by at least one of the generated search criterion maps:
      determine, based at least in part on the generated search criterion maps, one or more search criteria associated with the product; and
      generate a product map mapping the product to the one or more search criteria associated with the product as identified within at least one of the generated search criterion maps; and
   generate, for display to a user, a web page for a first product referenced by at least one of the generated search criterion maps, wherein the web page includes at least one search criterion of the one or more search criteria associated with the first product by a product map corresponding to the first product, wherein the at least one search criterion is inserted into the web page, and wherein the web page is generated based at least in part on the product map corresponding to the first product.

2. The non-transitory computer readable storage medium of claim 1, wherein the first product is a subject matter of an informational web page.

3. The non-transitory computer readable storage medium of claim 1, wherein the first product is a subject matter of a news article in a web page.

4. The non-transitory computer readable storage medium of claim 1, wherein the instructions that cause the computer to generate a web page further cause the computer to modify one or more meta tags for the web page.

5. The non-transitory computer readable storage medium of claim 1, wherein the instructions that cause the computer to generate a web page further cause the computer to configure the web page to display a listing of search criteria associated with the first product.

6. The non-transitory computer readable storage medium of claim 1, wherein the instructions that cause the computer to generate a web page further cause the computer to include highlighted instances of search criterion in the listing of search criteria that appear on the web page.

7. The non-transitory computer readable storage medium of claim 6, wherein the highlighted instances are hyperlinks to additional web pages related to the search criteria.

8. The non-transitory computer readable storage medium of claim 1, wherein the instructions that cause the computer to generate, for each search criterion of the plurality of search criteria, a search criterion map further cause the computer to associate a category of web pages with each search criterion.

9. The non-transitory computer readable storage medium of claim 1, wherein the instructions that cause the computer to generate, for each search criterion of the plurality of search criteria, a search criterion map further cause the computer to associate web pages to search criteria based on a relationship between the web page and other web pages associated with the search criterion.

10. The non-transitory computer readable storage medium of claim 1, wherein the instructions that cause the computer to generate, for each search criterion of the plurality of search criteria, a search criterion map further cause the computer to assign a relevance score to one or more products in at least one search criterion map.

11. The non-transitory computer readable storage medium of claim 10, wherein the instructions that cause the computer to generate a product map cause the computer to assign a relevance score to one or more of the search criteria in the product map based on a corresponding relevance score in the at least one search criterion map.

12. The non-transitory computer readable storage medium of claim 1, wherein each search criterion is associated with one or more web pages based on a received association indicator.

13. The non-transitory computer readable storage medium of claim 1, wherein the instructions further cause the computer to analyze the browsing activity of a user to identify a user behavioral pattern formed by the browsing activity.

14. The computer readable storage medium of claim 1, wherein the at least one attribute associated with each user is selected from a group comprising geographical location, age, and gender.

15. A computer-implemented method for optimizing a web page for a product offered for sale over a computer network, the method comprising:

receiving information related to browsing activity of users responsive to search results of a plurality of user searches, wherein the plurality of user searches corresponds to a plurality of search criteria, and wherein each search criterion of the plurality of search criteria corresponds to a search criterion utilized in a user search of the plurality of user searches;

for each search criterion of the plurality of search criteria, generating a search criterion map mapping the search criterion to a set of products, wherein the set of products are determined based at least in part on browsing activity of one or more users responsive to the search results corresponding to the search criterion, wherein each search criterion map references one or more products associated with each search criterion;

for each product referenced by at least one of the generated search criterion maps:
 determining, based at least in part on the generated search criterion maps, one or more search criteria associated with the product; and
 generating a product map mapping the product to the one or more search criteria associated with the product as identified within at least one of the generated search criterion maps; and in response to a user request for information regarding a first product, transmitting, for display to a user, at least one search criterion of the one or more search criteria associated with the first product, wherein the at least one search criterion is determined based at least in part on the product map corresponding to the first product.

16. The computer-implemented method of claim 15, wherein
 the browsing activity of users includes an indication of whether the users made a purchase of a product following a search based at least in part on a particular search criterion.

17. The computer-implemented method of claim 15, wherein
 the browsing activity of users includes the subject matter of web pages selected by the users following a search based at least in part on a particular search criterion.

18. The computer-implemented method of claim 15 further comprising modifying one or more meta tags for a web page associated with the first product.

19. The computer-implemented method of claim 18 further comprising configuring the web page to display a listing of search criteria associated with the first product.

20. The computer-implemented method of claim 15, wherein generating a search criterion map further includes associating a category of products with the search criterion associated with the search criterion map.

21. The computer-implemented method of claim 15, wherein generating a search criterion map further includes associating products to the search criterion associated with the search criterion map based on a relationship between a product and other products associated with the search criterion.

22. The computer-implemented method of claim 15, wherein generating a search criterion map further includes assigning a relevance score to one or more of the products in at least one search criterion map.

23. The computer-implemented method of claim 22, wherein generating a product map further includes assigning a relevance score to one or more of the search criteria in the product map based on the relevance score for the one or more of the products in the at least one search criterion map.

24. The computer-implemented method of claim 15, wherein each search criterion is associated with one or more products based on a received association of the search criterion with the one or more products.

25. The computer-implemented method of claim 15 further comprising analyzing the browsing activity of a user to identify a user behavioral pattern formed by the browsing activity.

26. The computer-implemented method of claim 15 further comprising inserting the at least one search criterion into a web page associated with the first product, and wherein inserting the at least one of search criterion into the web page further includes at least one of underlining, bolding, making selectable, and highlighting.

27. A computer system for optimizing a product web page for a product offered for sale over a computer network, comprising:
 one or more physical computing devices configured to implement:
  a search criterion mapping component configured to:
   receive information related to browsing activity of users responsive to search results of a plurality of user searches, wherein the plurality of user searches corresponds to a plurality of search criteria, and wherein each search criterion of the plurality of search criteria corresponds to a search criterion utilized in a user search of the plurality of user searches;
   for each search criterion of the plurality of search criteria, generate a search criterion map mapping the search criterion to a set of products, wherein the set of products are determined based at least in part on the browsing activity of a user that is responsive to the search results corresponding to the search criterion, wherein each search criterion map references one or more products associated with each search criterion;
  a map reversal component configured to, for each product referenced by at least one of the generated search criterion maps:
   determine, based at least in part on the generated search criterion maps, one or more search criteria associated with the product;
   generate a product map mapping the product to the one or more search criteria associated with the product as identified within at least one of the generated search criterion maps; and
  an interface component configured to:
   transmit, for display to a user, at least one search criterion of the one or more search criteria associated with a first product, wherein the at least one search criterion is determined based at least in part on the product map corresponding to the first product.

28. The computer system of claim 27, wherein the browsing activity of a user includes an indication of whether the user made a purchase of a product following a search for a particular search criterion.

29. The computer system of claim 27, wherein the browsing activity of a user includes the subject matter of a web page selected by the user following a search based at least in part on a particular search criterion.

30. The computer system of claim 27 further comprising a web page generation component configured to modify of one or more meta tags for a web page associated with the first product.

31. The computer system of claim 27 further comprising a web page generation component configured to configure a web page to display a listing of search criteria associated with the first product.

32. The computer system of claim 27, wherein the search criterion mapping component is further configured to associate a category of products with each search criterion.

33. The computer system of claim 27, wherein the search criterion mapping component is further configured to associate products to search criteria based on a relationship between a product and other products associated with a particular search criterion.

34. The computer system of claim 27, wherein the search criterion mapping component is further configured to assign a relevance score to one or more of the products in at least one search criterion map.

35. The computer system of claim 34, wherein the map reversal component is further configured to assign a relevance score to one or more of the search criteria in each product map based on the relevance score for the one or more of the products in the at least one search criterion map.

36. The computer system of claim 27, wherein each search criterion is associated with one or more products based on a received association of the search criterion with the one or more products.

37. The computer system of claim 27, wherein the search criterion mapping component is further configured to update each search criterion map, and wherein updating the plurality of search criterion maps comprises deletion of one or more search criteria.

38. The computer system of claim 27 the search criterion mapping component is further configured to analyze the browsing activity of a user to identify a user behavioral pattern formed by the browsing activity.

39. The computer system of claim 27, wherein display to a user of the at least one search criterion includes at least one of underlining, bolding, making selectable, and highlighting.

* * * * *